(12) United States Patent
Mir et al.

(10) Patent No.: US 7,412,528 B2
(45) Date of Patent: Aug. 12, 2008

(54) AVOIDING PPP TIME-OUTS DURING IPCP NEGOTIATIONS

(75) Inventors: Idreas Mir, San Diego, CA (US); Senthil Viswanathan, San Diego, CA (US); Marcello Lioy, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 813 days.

(21) Appl. No.: 10/649,552

(22) Filed: Aug. 26, 2003

(65) Prior Publication Data

US 2004/0132473 A1 Jul. 8, 2004

Related U.S. Application Data

(63) Continuation-in-part of application No. 09/483,351, filed on Jan. 14, 2000, now Pat. No. 6,775,553.

(51) Int. Cl.
*G06F 15/16* (2006.01)

(52) U.S. Cl. ...................................................... 709/230

(58) Field of Classification Search .................. 709/230
See application file for complete search history.

(56) References Cited

U.S. PATENT DOCUMENTS

| | | | |
|---|---|---|---|
| 5,708,655 A | 1/1998 | Toth et al. | |
| 6,061,739 A | 5/2000 | Reed et al. | |
| 6,111,866 A | 8/2000 | Kweon et al. | |
| 6,205,490 B1 | 3/2001 | Karapetkov et al. | |
| 6,212,563 B1 | 4/2001 | Beser | |
| 6,483,822 B1 * | 11/2002 | Lioy et al. | 370/329 |
| 6,775,553 B1 * | 8/2004 | Lioy | 455/461 |
| 2002/0115993 A1 * | 8/2002 | Hooven | 606/41 |
| 2002/0145993 A1 | 10/2002 | Wenzel et al. | |
| 2002/0145996 A1 | 10/2002 | Chowdhury et al. | 370/338 |
| 2003/0227937 A1 * | 12/2003 | Abrol et al. | 370/457 |

FOREIGN PATENT DOCUMENTS

| | | |
|---|---|---|
| WO | 9943133 | 8/1999 |
| WO | 0152499 | 7/2001 |

OTHER PUBLICATIONS

International Patent Application: PCT/US01/00942, Publication No. WO 01/52499 A2, Lioy, Marcello, Jul. 19, 2001.*

(Continued)

*Primary Examiner*—Jason Cardone
*Assistant Examiner*—William J Goodchild
(74) *Attorney, Agent, or Firm*—Howard Seo; Abdollah Katbab; Thomas Rouse

(57) ABSTRACT

Methods and apparatus are presented for extending the protocol synchronization period between a PPP client and a PPP server, wherein the PPP server is located on a wireless communication device. In one aspect, the PPP server generates and sends an IPCP Configure-Nak message to the PPP client whenever the PPP client sends an IPCP Configure-Request message, wherein an arbitrary non-zero value is deliberately sent as the primary DNS address, the secondary DNS address, the primary WINS address, or the secondary WINS address is sent in the IPCP Configure-Nak message. The IP address is deliberately omitted from the IPCP Configure-Nak message.

13 Claims, 6 Drawing Sheets

OTHER PUBLICATIONS

International Patent Application: PCT/US00/15662, Publication No. WO 00/76173 A1, Lioy, Marcello, Dec. 14, 2000.*

Floroiu et al., "Seamless handover in terrestrial radio access networks: a case study", Communications Magazine, IEEE vol. 41, Issue 11, Nov. 2003, pp. 110-116.*

ETSI Standards, European Telecommunications Standards Institute, Sophia-Antipo, Fr. ; "Digital cellular telecommunications system (Phase 2+): General Packet Radio Service (GPRS); Interworking between the Public Land Mobile Network (PLMN) supporting GPRS and Packet Data Networks (PDN) (3GPP TS 09.61 version 7.10.0 Release 1998); ETSI TS 101 348" Vo3. 3-CN3; SMG3 SMG4, No. V7100, Jun. 2003.

TIA/EIA Interim Standard; "Data Services Options for Spread Spectrum Systems: High Speed Packet Data Service" TIA/EIA/IS-707-a.9 (PN-4159.9), XX, XX, Mar. 1999.

Simpson, W. "The Point-to Point Protocol (PPP)" The Point-to Point Protocol, Jul. 1994.

IP Protocol Request for Comment 792 "Internet Protocol Darpa Internet Program Protocol Specification" (Sep. 1981).

IS-707.2 "Data Service Options for Wideband Spread Spectrum Systems: Radio Link Protocol" (Feb. 1998).

TIA/EIA 232-F "Interface Between Data Terminal Equipment and Data circuit-Terminating Equipment Employing Serial Binary Data Interchange" (Oct. 1997).

TIA/EIA IS-707.5, Data Service Options for Wideband Spread Spectrum Systems: Packet Data Services (Feb. 1998).

TIA/EIA/IS-707-A.9 Data Service Options for spread Spectrum Systems: High Speed Packet Data Services, TIA/EIA Interim Standard (Mar. 1999).

International Search Report-PCT/US04/026346, International Search Authority European Patent Office, Dec. 9, 2004.

* cited by examiner

AVOIDING PPP TIME-OUTS DURING IPCP NEGOTIATIONS

RELATED APPLICATIONS

This application is a continuation-in-part of U.S. patent application Ser. No. 09/483,351, filed on Jan. 14, 2000 now U.S. Pat. No. 6,775,553 and entitled "Method for Avoiding PPP Time-Outs During IPCP Negotiations," which is pending.

BACKGROUND

1. Field

This invention generally relates to the field of wireless communications. More particularly, the present invention relates to extending protocol synchronization periods for radio networks.

2. Background

Recent innovations in wireless communication and computer-related technologies, as well as the unprecedented growth of Internet subscribers, have paved the way for mobile computing. In fact, the popularity of mobile computing has placed greater demands on the current Internet infrastructure to provide mobile users with more support. A crucial part of meeting these demands and providing users with the necessary support is the use of Code Division Multiple Access (CDMA) technology in wireless communication systems.

CDMA is a digital radio-frequency (RF) channelization technique defined in the Telecommunications Industry Association/Electronics Industries Association Interim Standard-95 (TIA/EIA IS-95), entitled "MOBILE STATION-BASE STATION COMPATIBILITY STANDARD FOR DUAL-MODE WIDEBAND SPREAD SPECTRUM CELLULAR SYSTEM", published in July 1993 and herein incorporated by reference. Wireless communication systems employing this technology assign a unique code to communication signals and spread these communication signals across a common (wideband) spread spectrum bandwidth. As long as the receiving apparatus in a CDMA system has the correct code, it can successfully detect and select its communication signal from the other signals concurrently transmitted over the same bandwidth. The use of CDMA produces an increase in system traffic capacity, improves overall call quality and noise reduction, and provides a reliable transport mechanism for data service traffic. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 (cdma2000 1xEV-DV) and IS-856 (cdma2000 1xEV-DO) and has been approved by the TIA. Another CDMA standard is the W-CDMA standard, as embodied in 3rd Generation Partnership Project "3GPP", Document Nos. 3G TS 25.211, 3G TS 25.212, 3G TS 25.213, and 3G TS 25.214. The W-CDMA standard is incorporated into a GSM-based system known as Universal Mobile Telecommunications Systems (UMTS).

The telecommunication standards cited above are examples of only some of the various communications systems that can be implemented. One general category of standards is referred to as "Third Generation" or "3G," of which cdma2000 and W-CDMA are both members. These 3G standards are directed towards increased data rates, which will support increased user numbers and data-intensive applications.

FIG. 1 illustrates the basic elements of such a wireless data communication system 100. Artisans of ordinary skill will readily appreciate that these elements, and their interfaces, may be modified, augmented, or subjected to various standards known in the art, without limiting their scope or function. System 100 allows a mobile terminal equipment, TE2 device 102 (e.g., the terminal equipment such as laptop or palmtop computer) to communicate with an Interworking Function (IWF) 108. System 100 includes a wireless communication device, MT2 device 104 (e.g., wireless telephone), and a Base Station/Mobile Switching Center (BS/MSC) 106. The IWF 108 serves as a gateway between the wireless network and other networks, such as the Public Switched Telephone Network or wireline packet data networks providing Internet— or Intranet-based access. An L interface couples IWF 108 to BS/MSC 106. Often the IWF 108 will be co-located with the BS/MSC 106. The TE2 device 102 is electronically coupled to the MT2 device 104 via the $R_m$ interface. The MT2 device 104 communicates with the BS/MSC 106 via the wireless interface $U_m$. The TE2 device 102 and the MT2 device 104 may be integrated into a single unit (e.g., MT0 device) or may be separated out, as in the case of an installed mobile phone unit in which a laptop is the TE2 device 102 and the transceiver is the MT2 device 104. The combination of the TE2 device 102 and the MT2 device 104, whether integrated or separate, is generally referred to as a mobile station (MS) 103.

Other support is made possible by applying various well-known protocols to control, manage, or otherwise facilitate different aspects of wireless communications. For example, the life-blood of the Internet infrastructure, the Internet Protocol (IP), has been incorporated in many wireless communication services to accommodate packet-oriented services. The IP protocol specifies the addressing and routing of packets (datagrams) between host computers and is defined in Request For Comment 791 (RFC 791) entitled, "INTERNET PROTOCOL DARPA INTERNET PROGRAM PROTOCOL SPECIFICATION," published September 1981.

The IP protocol is a network layer protocol that encapsulates data into IP packets for transmission. Addressing and routing information is affixed in the header of the packet. IP headers contain 32-bit addresses that identify the sending and receiving hosts. These addresses are used by intermediate routers to select a path through the network for the packet towards its ultimate destination at the intended address. Thus, the IP protocol allows packets originating at any Internet node in the world to be routed to any other Internet node in the world.

Another well-known protocol incorporated in wireless communications systems is the Point-to-Point Protocol (PPP) protocol, which provides, inter alia, Internet access. The PPP protocol is described in detail in Request for Comments 1661 (RFC 1661), entitled "THE POINT-TO-POINT PROTOCOL (PPP)", published July 1994.

Essentially, the PPP protocol specifies a method for transporting multi-protocol datagrams over point-to-point links and contains three main components: a method of encapsulating multi-protocol datagrams; a Link Control Protocol (LCP) for establishing, configuring, and testing a data link connection; and a family of Network Control Protocols (NCPs) for establishing and configuring different network-layer protocols.

In an effort to provide a host of services on wireless communication systems, various standards have been developed to accommodate the wireless data transmission between the TE2 device 102 and the IWF 108. For example, the TIA/EIA IS-707.5 standard, entitled "DATA SERVICE OPTIONS FOR WIDEBAND SPREAD SPECTRUM SYSTEMS: PACKET DATA SERVICES," published February 1998, and herein incorporated by reference, defines requirements for support of packet data transmission capability on TIA/EIA IS-95 systems and specifies a suite of packet data bearer services.

In particular, the IS-707.5 standard provides certain packet data service modes that may be used to communicate between the TE2 device 102 and IWF 108 via BS/MSC 106. In doing so, IS-707.5 introduces the Network Model, which provides a specific mode of operation. The Network Model represents the situation where a first PPP link is set up between the TE2 device 102 and the MT2 device 104, and a second PPP link, independent of the first, is set up between the MT2 device 104 and the IWF 108. This model makes the MT2 device 104 responsible for unframing any received PPP packets and re-framing them before forwarding them to their final destination as well as providing mobility management and network address management.

FIG. 2 illustrates the protocol stacks in each entity of the IS-707.5 Network Model. At the far left of FIG. 2 is a protocol stack, shown in conventional vertical format, depicting the protocol layers running on the TE2 device 102 (e.g., the mobile terminal, laptop or palmtop computer). The TE2 protocol stack is illustrated as being logically connected to the MT2 device 104 protocol stack over the Rn interface. The MT2 device 104, is illustrated as being logically connected to the BS/MSC 106 protocol stack over the $U_m$ interface. The BS/MSC 106 protocol stack is, in turn, shown as being logically connected to the IWF 108 protocol stack over the L interface.

As an illustration, the protocols depicted in FIG. 2, operate as follows: the PPP layer on the TE2 102 device associated with the $R_m$ interface (i.e., $PPP_R$ 208), encodes packets from the upper layer protocols 204, and the network layer IP protocol 206. The $PPP_R$ layer 208 then transmits the packets across the $R_m$ interface using an applicable protocol, such as, for example, the TIA/EIA 232-F protocol 210, and the packets are received by the TIA/EIA-232-F-compatible port on the MT2 device 104. The TIA/EIA-232-F standard is defined in "INTERFACE BETWEEN DATA TERMINAL EQUIPMENT AND DATA CIRCUIT-TERMINATING EQUIPMENT EMPLOYING SERIAL BINARY DATA INTERCHANGE", published in October 1997 and herein incorporated by reference. It is to be understood that other standards or protocols known to artisans of ordinary skill in the art may be used to define the transmission across the $R_m$ interface. For example, other applicable $R_m$ interface standards include, the "UNIVERSAL SERIAL BUS (USB) SPECIFICATION, Revision 1.1", published in September 1998, and the "BLUETOOTH SPECIFICATION VERSION 1.0A CORE, published in July 1999, both incorporated by reference.

The TIA/EIA 232-F protocol 212 on the MT2 device 104 receives the packets from the TE2 device 102 and passes them to the $PPP_R$ layer 213 of the MT2 device 104. The $PPP_R$ layer 213 unframes the packets encapsulated in the PPP frames and typically, when a data connection is up, layer 213 transfers the packets to the PPP layer associated with the $U_m$ interface (i.e., $PPP_U$ layer 217). $PPP_U$ layer 217 formats the packets in PPP frames for transmission to a $PPP_U$ peer located in the IWF 108. The Radio Link Protocol (RLP) 216 and IS-95 protocol 214, both of which are well known in the art, are used to transmit the packet-encapsulated PPP frames to the BS/MSC 106 over the $U_m$ interface. The RLP protocol 216 is defined in the IS-707.2 standard, entitled "DATA SERVICE OPTIONS FOR WIDEBAND SPREAD SPECTRUM SYSTEMS: RADIO LINK PROTOCOL", published in February 1998 and the IS-95 protocol is defined in the IS-95 standard identified above. In a WCDMA system, the PPP layer sits on the Radio Link Control (RLC) layer, which has a similar functionality as the RLP layer.

As stated above, the $PPP_R$ protocol 213 transfers the packets to the $PPP_U$ protocol 217 when a data link connection is established. RFC 1661 provides that Link Control Protocol (LCP) packets must be exchanged and negotiated over each PPP link (i.e., $PPP_R$ and $PPP_U$) in order to establish, configure, and test the data link connection.

Once the LCP packets are exchanged, the link options negotiated, and the data link connection established, a network layer connection must be established between the TE2 device 102 and the IWF 108. Such a connection employs protocols 206, 215 218, 230, that include, for example, the IP protocol. The negotiating, configuring, enabling, and disabling of the IP protocol on both ends of the PPP links is provided by the well-known Internet Protocol Control Protocol (IPCP). JPCP is a part of a family of Network Control Protocols (NCPs) included in the PPP protocol and is described in Request for Comment (RFC) 1332, "THE PPP INTERNET PROTOCOL CONTROL PROTOCOL (JPCP)", published in May 1992.

The IPCP protocol employs the standard PPP Configure-Request, Configure-Ack, and Configure-Nak messages to negotiate various options, including the request and designation of IP addresses. IPCP provides that a requester requesting an IP address, generates a Configure-Request message, which contains a particular address. If the particular IP address is acceptable, a Configuration-Ack message is sent by a peer to the requester. If the particular IP address is not acceptable, then the peer sends a Configure-Nak message containing a suggested IP address. The requester then transmits a new Configure-Request message with the suggested IP address and the peer responds with a Configure-Ack.

It is only possible to assign single IP address across the $PPP_U$ and $PPP_R$ links as there is no mechanism in IPCP to assign more than one address. This means that the IP address that is assigned from the IWF over $PPP_U$, must further be assigned to the TE2 over $PPP_R$. In the Network Model, while IPCP address negotiations can occur separately for both the $R_m$ interface and the $U_m$ interface. As such, the MT2 device 104 must first negotiate an IP address over the $U_m$ interface with the IWF 108 at one end of the $PPP_U$ link, before the address can be assigned to the TE2 device 102 at the other end of the $PPP_R$ link.

The consummation of IPCP address negotiations may be obstructed, however, by operational delays. For example, such delays can occur if the link between the MT2 device 104 and the IWF 108 is slower than the link between the TE2 device 102 and the MT2 device 104. As such, there exists a possibility that IPCP address negotiations are reached faster on the $R_m$ link than on the $U_m$ link. The TE2 device 102 may, therefore, request an IP address from the MT2 device 104, which cannot be granted because the MT2 device 104 has not completed the requisite address negotiations on the $U_m$ link to render an IP address from the IWF 108. Although the TE2 device 102 is capable of waiting for the MT2 device 104 to eventually render an IP address, there are implementation-specific time-outs on the TE2 device 102, which can cause the TE2 device 102 to abort the IP address request, and therefore PPP negotiations altogether.

Another example of operational delays occurs when the IWF 108 has to get the IP address, which will eventually be assigned to the TE2 device 102, from some other entity before it can pass it on to the MT2 device 104. In doing so, it may take several seconds before the MT2 device 104 receives the IP address.

By way of example, it is noted that some applications running on the TE2 device 102 allow the TE2 device 102 to generate Configure-Request messages every 3 seconds for 3 attempts before the TE2 device 102 times out. In such cases, if it takes more than a total of 9 seconds to receive an IP address, the TE2 device 102 aborts the address request. Clearly, either of the two scenarios noted above can generate delays that can lead to the TE2 device 102 to abort prematurely.

Therefore, what is needed is a novel method of avoiding time-outs to sustain IPCP address negotiations.

SUMMARY OF THE INVENTION

The needs identified above are addressed by providing methods and apparatus for avoiding timeouts to sustain IPCP negotiations. In one aspect, a method is presented for extending a protocol synchronization period between a Point-to-Point Protocol (PPP) client and a PPP server, wherein the PPP server is located on a wireless communication device, the method comprising: generating a negative acknowledgment message at the PPP server in response to an Internet Protocol Control Protocol (IPCP) configuration request from the PPP client, wherein the negative acknowledgement message includes deliberately arbitrary supplemental IPCP information and does not include an IP address option; and generating an acknowledgement message at the PPP server in response to an IPCP configuration request from the PPP client if the PPP server has received all required parameters to complete the protocol synchronization period.

In another aspect, apparatus is presented for extending a protocol synchronization period between a Point-to-Point Protocol (PPP) client and a PPP server, wherein the PPP server is located on a wireless communication device, the apparatus comprising: at least one memory element; and at least one processing element configured to execute a set of instructions stored in the at least one memory element, the set of instructions for: generating a negative acknowledgment message at the PPP server in response to an Internet Protocol Control Protocol (IPCP) configuration request from the PPP client, wherein the negative acknowledgement message includes deliberately arbitrary supplemental IPCP information and does not include an IP address option; and generating an acknowledgement message at the PPP server in response to an IPCP configuration request from the PPP client if the PPP server has received all required parameters to complete the protocol synchronization period.

DETAILED DESCRIPTION

It will be apparent to one of ordinary skill in the art that embodiments may be realized in a variety of implementations, including the software, firmware, and hardware of the entities illustrated in the figures (i.e., TE2 device 102, MT2 device 104, BS/MSC 106 and IWF 108). The actual software code or control hardware used to implement the embodiments is not limiting of the scope of the embodiments. Thus, the operation and behavior of the embodiments will be described without specific reference to the actual software code or hardware components. Such non-specific references are acceptable because it is clearly understood that a person of ordinary skill in the art would be able to design software and control hardware to implement the embodiments based on the description herein.

Figure 3A:
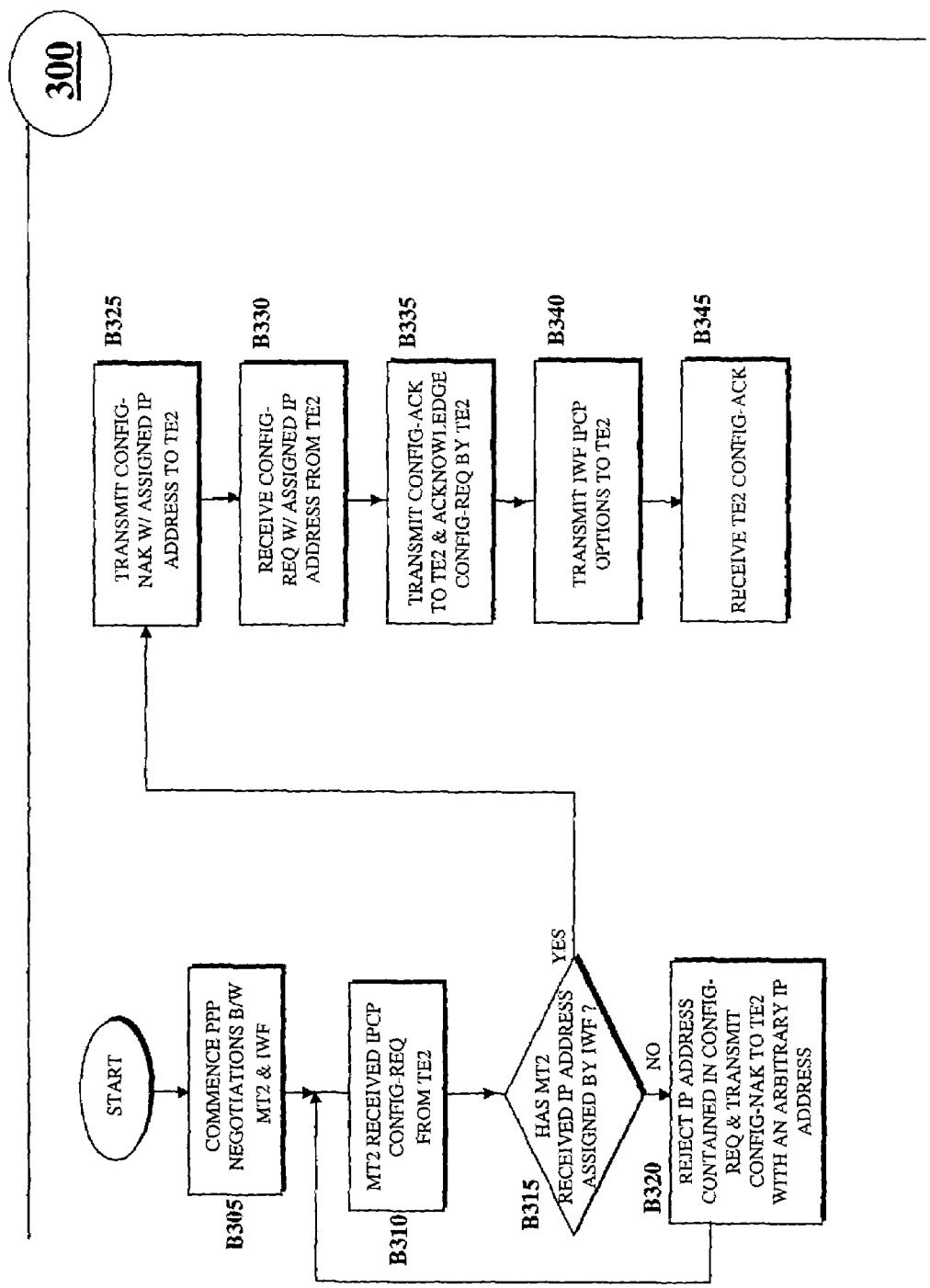
FIG. 3A is a flow-chart diagram describing an embodiment.
Figure 3B:
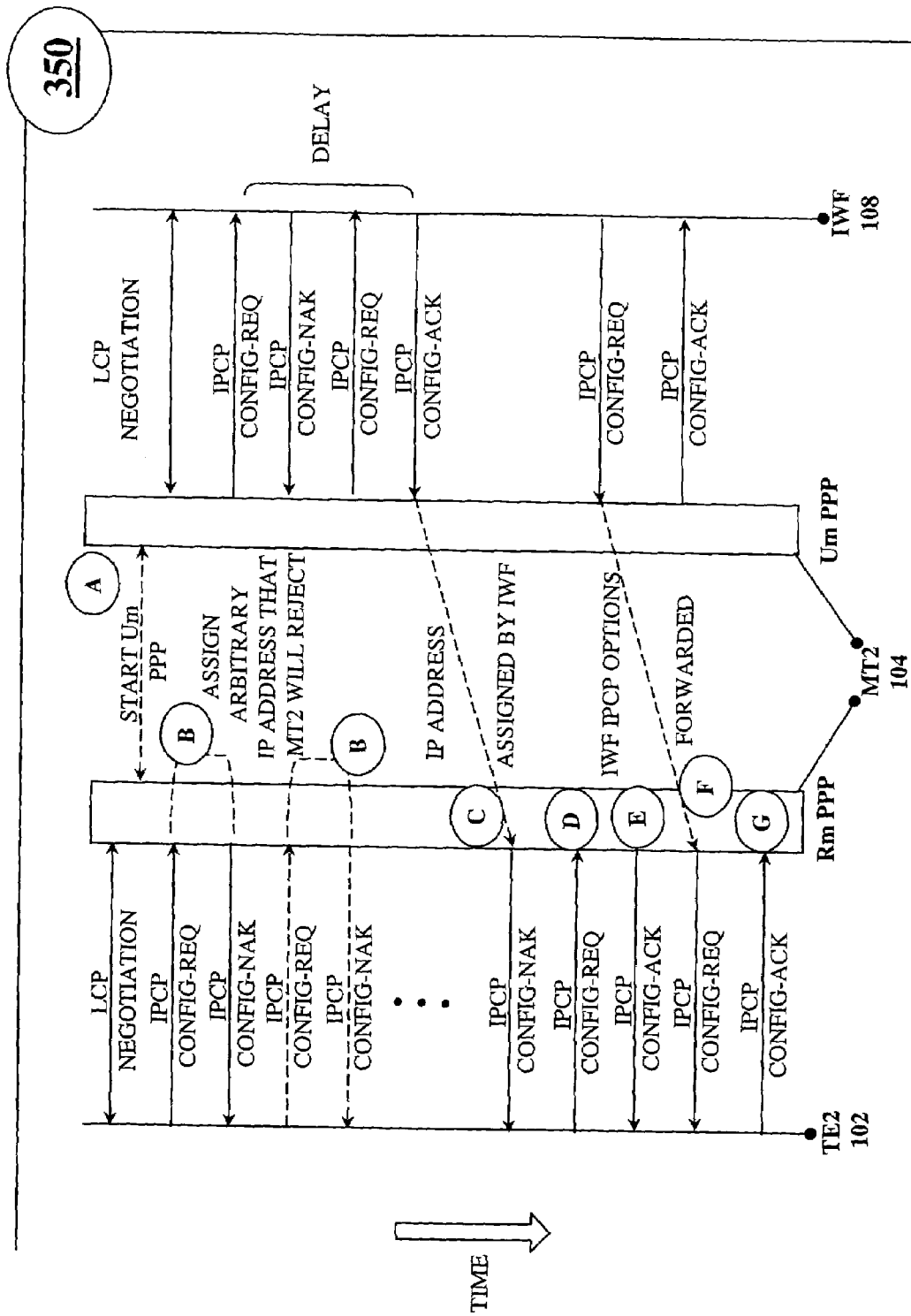
FIG. 3B is a protocol-message flow diagram describing the operation of an embodiment.

FIG. 3A is a flow-chart diagram depicting an embodiment of the present invention and FIG. 3B is a protocol-message flow diagram describing the operation of an embodiment of the invention. As indicated in FIG. 3A, the MT2 device 104, in block B305, commences PPP negotiations across the $U_m$ interface with the IWF 108. This event is triggered by the start of LCP negotiations on the $R_m$ interface, as depicted in FIG. 3B (see reference numeral A).

In block B310, the MT2 device 104 waits until it has received an IPCP Configure-Request message from the TE2 device 102. Once the MT2 device 104 has received a Configure-Request message from the TE2 device 102, the MT2 device 104 progresses to block B315.

In block B315, the MT2 device 104 determines whether it has received an IP address, assigned by the IWF 108, in response to the Configure-Request message from the TE2 device 102. If it has not, the MT2 device 104 advances to block B320, where it rejects the IP address contained within the Configure-Request message and transmits a Configure-Nak message with an arbitrary IP address. (See, reference numeral B in FIG. 3B). The arbitrary IP address is an address that will be rejected by the MT2 device 104. Upon transmitting the Configure-Nak message with the arbitrary IP address, the MT2 device 104 loops back to block B310 to await another IPCP Configure-Request message from the TE2 device 102, with the arbitrary IP address. Because the arbitrary IP address is not the IP address assigned by the IWF 108, the MT2 device 104 is directed back to block B320 where it, once again, rejects the IP address contained within the Configure-Request message and transmits a Configure-Nak message with an arbitrary IP address. The arbitrary address may be the same address as the previous iteration or may be a different address. The loop created by the series of blocks B310-B315-B320 iterate until the MT2 device 104 determines that it has received an IWF 108-assigned IP address. By engaging the TE2 device 102 and triggering it to generate Configure-Req messages, the MT2 device 104 prevents the TE2 device 102 from timing out, thereby sustaining the IPCP address negotiations. It would also be possible to introduce a delay into the loop which will reduce the number of messages exchanged between the MT2 device 104 and the TE2 device 102.

Returning back to block B315, if the MT2 device 104 determines that it has received an IWF 108-assigned IP address, the MT2 device 104 progresses to B325 where it transmits a Configure-Nak message containing the assigned IP address to the TE2 device 102. (See, reference numeral C). The MT2 device 104 then receives, in block B330, a Configure-Request message with the assigned IP address from the TE2 device 102. (See, reference numeral D).

The MT2 device 104 advances to block B335, where it transmits a Config-Ack message to the TE2 device 102, to acknowledge the Configure-Request message from the TE2 device 102. (See, reference numeral E). In block B340, the MT2 device 104 then transmits the IPCP options negotiated over the $U_m$ link with the IWF 108 to the TE2 device 102. (See, reference numeral F). The MT2 device 104 then receives, in block B345, a Config-Ack message from the TE2 device 104, acknowledging the options in use by the IWF 108-assigned IP address. (See, reference numeral G). It is noted that the processes in blocks B340 and B345 are not strictly required, as the MT2 device 104 could send any arbitrary IPCP values to the TE2 device 102 since all packets are being framed and unframed through the MT2 device 104.

Thus, the above-described embodiment is capable of avoiding implementation-specific time-outs by supplying the TE2 device 102 with Configure-Nak messages, which contain arbitrary IP addresses that will be rejected by the MT2 device 104. The Configure-Nak messages trigger the TE2 device 102 into generating Configure-Request messages. This interplay continues until the MT2 device 104 receives the IWF 108-assigned IP address and forwards this IP address to the TE2 device 102 in a Configure-Nak message. In this manner, the TE2 device 102 is precluded from prematurely aborting due to implementation-specific timeouts and PPP negotiations are sustained.

More Embodiments for Deliberately Extending PPP Negotiations

In another embodiment, the TE2 device may be prevented from prematurely timing out of the IPCP address negotiations and prevented from dropping the requests for specific fields in the IPCP packet exchange. The embodiment is for extending the IPCP protocol synchronization period by having the PPP server engage the PPP client in an extended dialogue by the deliberate use of IPCP Configure-Nak messages. The IPCP Configure-Nak messages that are used in this extended dialogue comprise one or more of the following optional fields in the IPCP packets: the primary Domain Naming System (DNS) address, secondary DNS address, primary Windows Internet Naming Service (WINS) address, and/or secondary WINS address. The PPP server engages the PPP client in this extended dialogue during the IPCP negotiation phase regardless of the actual parameters requested in the IPCP configuration request messages from the PPP client. This extended dialogue forces the PPP client to hold on to all the parameters requested in the first IPCP configuration request message until the IPCP negotiation phase is completed.

For purposes of illustrative ease, the terminology "supplemental IPCP information" will be used hereinafter to refer to primary DNS addresses, secondary DNS addresses, primary WINS addresses, and secondary WINS addresses, either individually or in any combination thereof. It should also be noted that the usage of the terminology "IP address" has two meanings in the art. First, the term "IP address" may refer generically to any address discussed in RFC 791. Second, the term "IP address" may refer specifically to a specific field in an IPCP packet, which is for the assignment of an address to a PPP client. The embodiments that are described hereinafter refer to the second meaning whenever the term "IP address" is used.

The supplemental IPCP information may be sent within a Configure-Nak message from the MT2 device to the TE2 device in order to extend the protocol synchronization period of the IPCP negotiations for a duration that may be indefinite. In other words, a software entity on a computer-readable medium may be designed to indefinitely repeat a different type of address rather than an IP address in order to prolong the protocol synchronization period.

Figure 4:
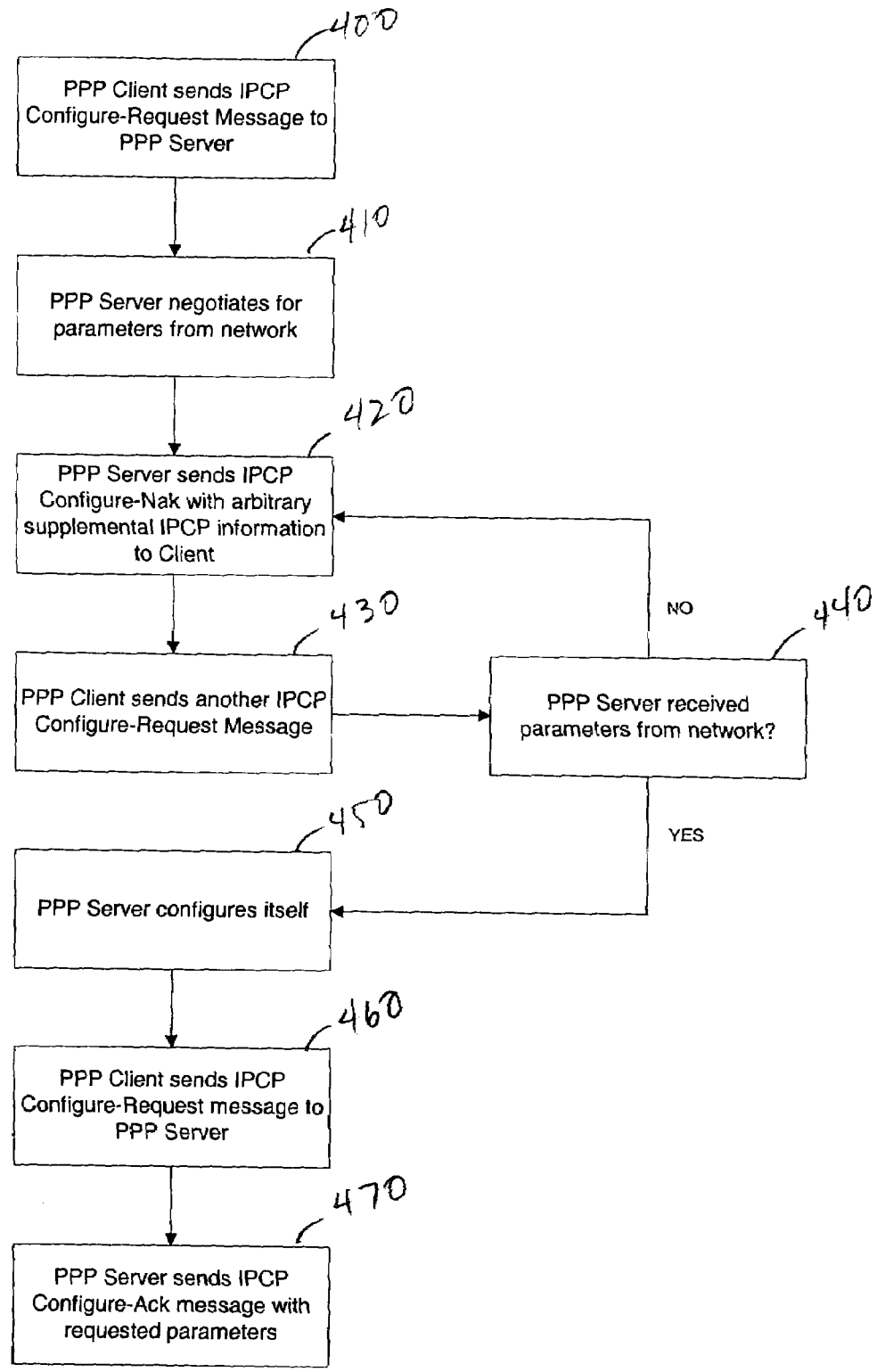
FIG. 4 is a flow-chart diagram describing another embodiment.

FIG. 4 is a flowchart illustrating this embodiment. For purposes of illustrative ease, terminology referring to the software entities "PPP client" and "PPP server" is used hereinafter. The PPP client and the PPP server may reside at separate physical locales, such as two separate electronic devices, or alternatively, the PPP client and the PPP server may reside within the same electronic device. For example, the functionality of the PPP client may be implemented by one processing unit while the functionality of the PPP server may be implemented by another processing unit, both processing units being located within the same electronic device.

At block 400, the PPP client sends an IPCP Configure-Request message to the PPP server. Upon receipt of the IPCP Configure-Request message, the PPP server negotiates for parameters from the network at block 410. However, the PPP server cannot respond to the request from the PPP client until the required parameters have been obtained from the network.

At block 420, the PPP server generates and sends an IPCP Configure-Nak message to the PPP client, wherein supplemental IPCP information is sent with non-zero values. The supplemental IPCP information may comprise the primary DNS address, the secondary DNS address, the primary WINS address, the secondary WINS address or any combination thereof. In one aspect of this embodiment, an IP address is deliberately omitted from the IP address field of the IPCP Configure-Nak message. In another aspect of this embodiment, the action of block 420 may be performed before the action of block 410.

At block 430, the PPP client sends another IPCP Configure-Request message in response to the IPCP Configure-Nak message generated in block 420.

Blocks 420 and 430 repeat indefinitely until the PPP server receives the IPCP parameters from the network at Block 440.

At block 450, the PPP server configures itself with the actual IP, DNS, and WINS address received from the network and sends an IPCP Configure-Nak to the PPP client with the information that was used to configure the PPP server. At block 460, the PPP client sends an IPCP Configure-Request message with the parameters sent in block 450. At block 470, the PPP server sends an IPCP Configure-Ack for the requested parameters, which completes the protocol synchronization.

There exist different variations of the embodiment described in FIG. 4. In one aspect, the PPP server may be designed to send different subsets of the supplemental IPCP information in response to different IPCP Configure-Request messages, so that, for example, a first IPCP Configure-Nak message carries an arbitrary primary DNS address, a second IPCP Configure-Nak message carries an arbitrary secondary DNS address, a third IPCP Configure-Nak message carries an arbitrary primary WINS address, a fourth IPCP Configure-Nak message carries an arbitrary secondary WINS address, a fifth IPCP Configure-Nak message carries another arbitrary primary DNS address, and so forth. Using this aspect of the embodiment, each subsequent IPCP Configure-Nak message carries a different address value.

In another aspect, the PPP server may send the same arbitrary DNS and WINS addresses in all of the IPCP Configure-Nak messages. However, the one constant between the various aspects is that no IP address in the IP address field is sent. Again, it should be noted that "IP address" is used herein to refer to the specific field in the IPCP packet and not the generic meaning of the term.

The embodiment wherein an arbitrary DNS or WINS address is sent rather than an IP address has more advantages in certain wireless communication networks. For example, in a WCDMA system or a GSM/GPRS (Global System Mobile/General Packet Radio Service) system, the PPP client is configured to timeout if the wait for an IPCP response from the PPP server exceeds a set duration. The PPP client resends the IPCP request after three (3) seconds. The PPP client would resend the IPCP requests N times (N is typically set to 10 times) and then close the PPP link if no IPCP response is received. Hence, if the wireless connection between the PPP server and the network exceeds the timeout limits for that PPP client without receiving an IPCP packet, the PPP client would automatically terminate the PPP link.

Figure 1:
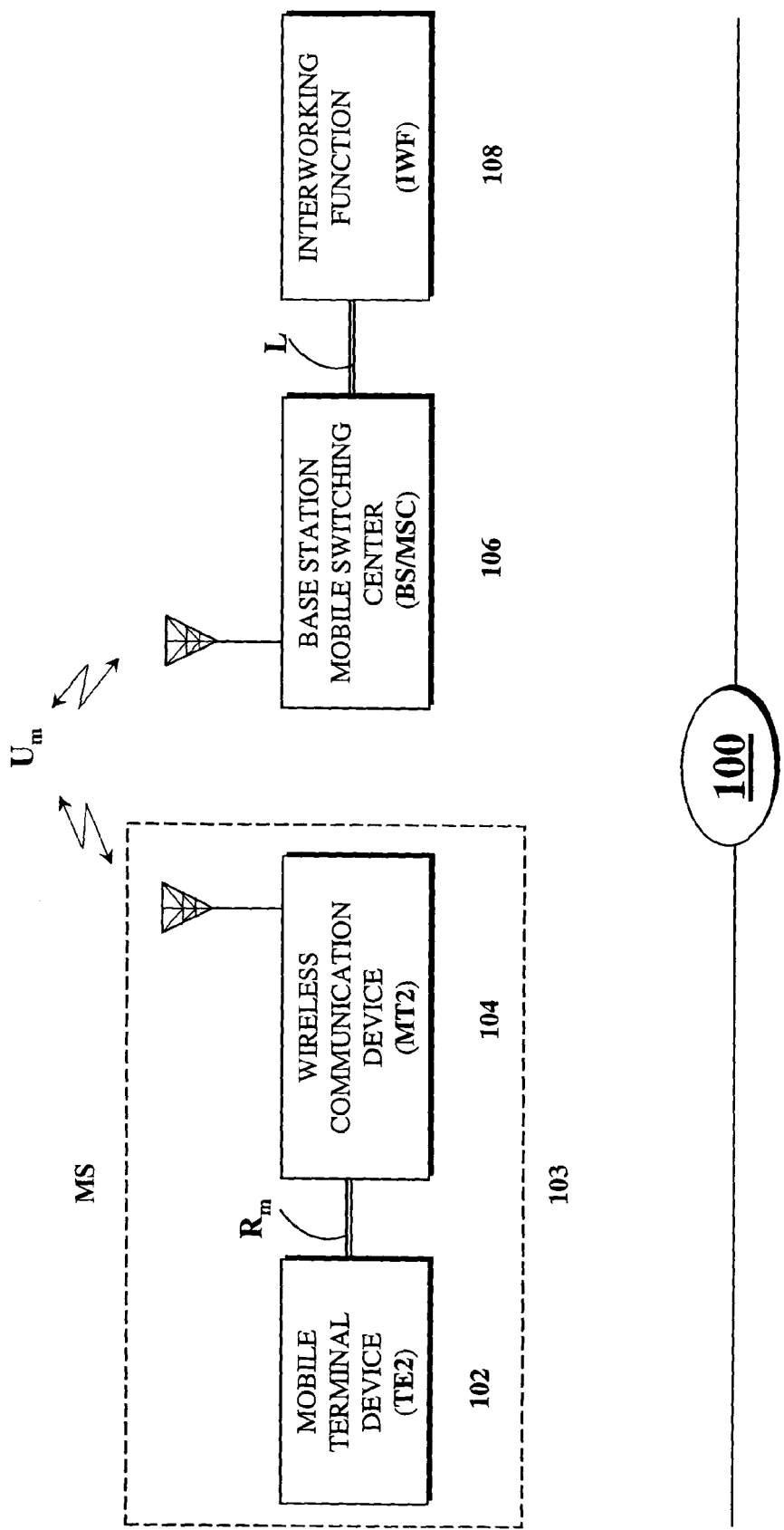
FIG. 1 is a high level block diagram depicting various elements of a wireless communication system.
Figure 2:
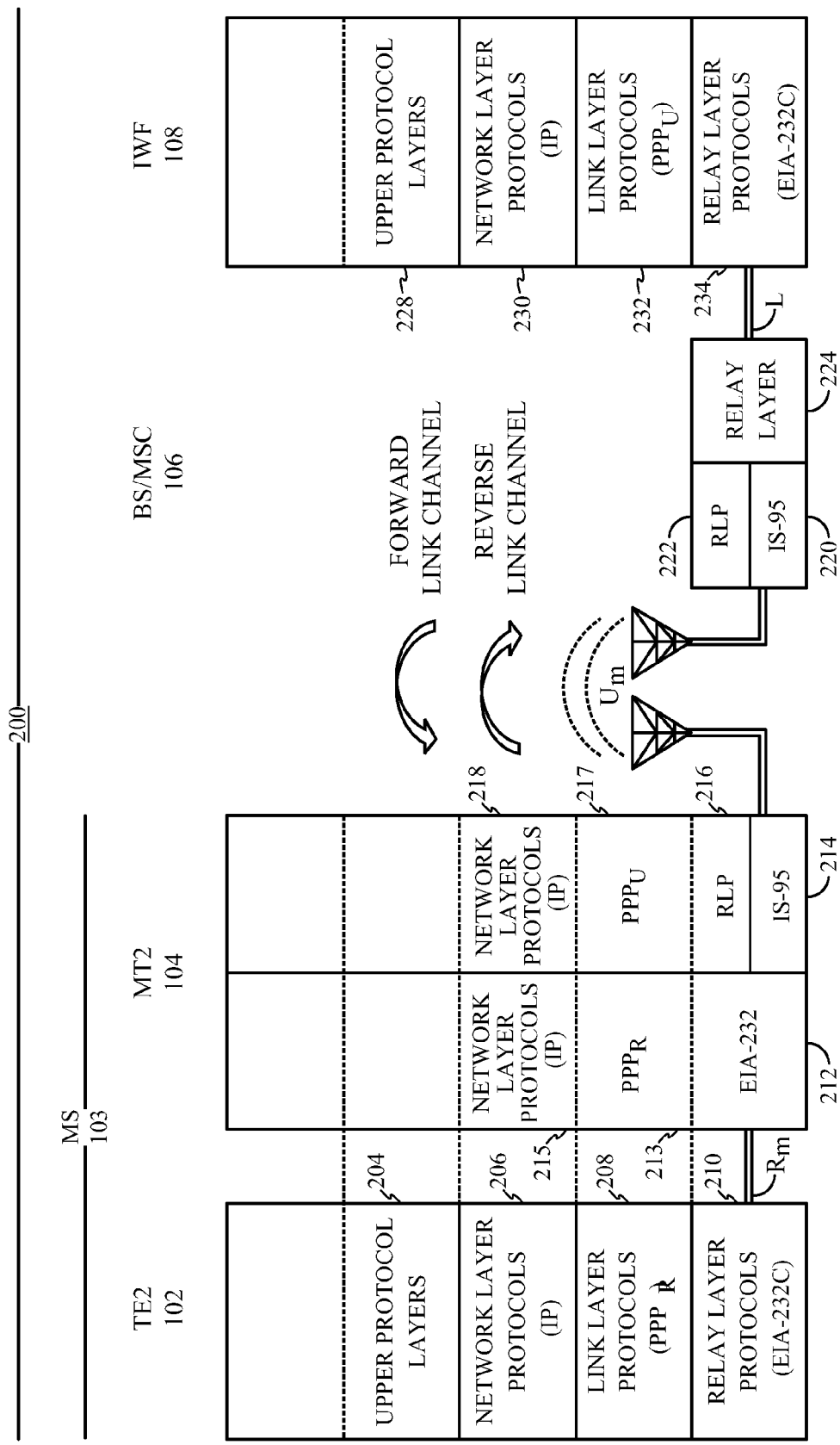
FIG. 2 schematically describes the protocol stacks of a wireless communication system.
Figure 5:
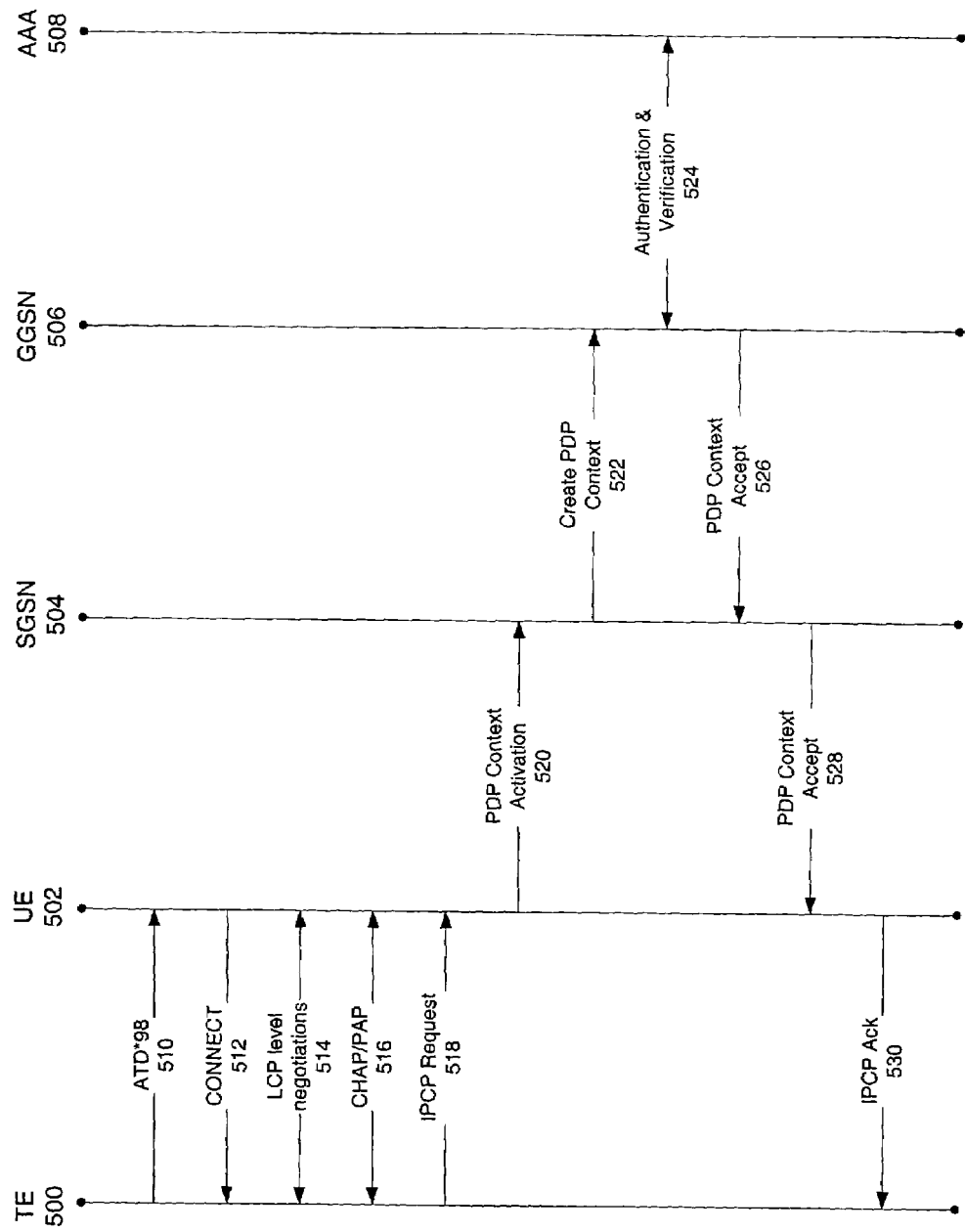
FIG. 5 is a protocol-message flow for setting up a packet data connection in a General Packet Radio Service (GPRS)-enabled network over GSM EDGE Radio Access Network (GERAN) or UMTS Terrestrial Radio Access Network (UTRAN) radio channels.

In a wireless network using GPRS for packet data services, the general architecture of the network is similar to that of FIG. 1. However, some differences exist. The mobile device is referred to as "user equipment" (UE), and base station functionality is described as part of the UMTS Terrestrial Radio Access Network (UTRAN), which is composed of radio network controllers (RNC) and Node Bs or as part of the GSM Edge Radio Access Network (GERAN), which is composed of the base station controllers (BSC) and base station transceivers (BTS). A packet from the UE is sent over the radio link to the RNC or BSC, and is then sent to a Serving GPRS Node (SGSN), which provides for packet switching, routing, and database functions to another node. Rather than having an IWF act as the portal between the wireless network and the packet data services network, a Gateway GPRS Support Node (GGSN) acts as the portal. The GGSN also acts to provide the packet switching, routing, and database functions for GPRS services. The various interfaces between the entities of the network also have different names. However, the overall principles are similar. FIG. 5 illustrates the flow of messages between the various entities in a GPRS network in order to set up a packet data connection, as opposed to a voice connection. The subject matter is described in more detail in the document 3GPP TS 29.061, entitled, "3rd Generation Partnership Project; Technical Specification Group Core Network; Interworking between the Public Land Mobile Network (PLMN) supporting packet based services and Packet Data Networks (PDN)," published on June 2003.

Terminal equipment (TE) 500 communicates an ATD*98 message 510 to the UE 502, to which the TE 500 is tethered. The ATD*98 message 510 is for invoking Packet Data Protocol (PDP) Context Activation. The UE 502 responds with a CONNECT message 512. The TE 500 and UE 502 then engage in Link Control Protocol (LCP) level negotiations 514. After the successful completion of LCP negotiations 514, Challenge Handshake Authentication Protocol (CHAP) or Password Authentication Protocol (PAP) negotiations 516 commence. After authentication parameters are negotiated between the TE 500 and UE 502, the TE 500 sends an IPCP request message 518 to the UE 502.

Once the UE 502 receives the IPCP Request 518, the UE 502 sends an Activate PDP Context request message 520 to the SGSN 504. The SGSN 504 creates a PDP Context message 522 and forwards the PDP Context message 522 to an appropriate GGSN 506. The GGSN 506 may then engage in authentication and verification procedures with an Administration, Authorization, and Authentication (AAA) server 508 to determine whether to grant access to the UE 502 for network services.

When the AAA server 508 grants permission, the GGSN 506 forwards a Create PDP Context response message 526 to the SGSN 504. The SGSN 504 forwards an Activate PDP Context Accept message 528 to the UE 502. The UE 502 then forwards an IPCP Configure acknowledgment message 520 to the TE 500, the receipt of which completes the setup for the packet data connection.

Referring to the flow described in FIG. 5, it can be observed that the timeout problem may be acute during PDP Context Activation, wherein a UMTS/GPRS device that is to act the part of the PPP server must contact the wireless network, and thereby acquire the parameters necessary to configure itself as the PPP server. The PDP Context Activation process often requires longer than 30 seconds to complete. This extended call setup time can be caused by a multitude of reasons. The reasons may include delays within the core network, which are incurred for operations like authentication and configuration towards the Remote Authentication Dial-In User Server (RADIUS) or the AAA server, delays within the UTRAN in establishment of the Radio Resource Control (RRC) Connection between the UE and the RNC or within the GERAN in establishment of GPRS Radio Resource (GRR) connection between the UE and the BSC under imperfect radio conditions, and delays due to cell reselections between random access attempts. The embodiment described in FIG. 4 would prevent the PPP client from terminating the PPP link during this activation process.

Another situation in which the embodiment would be useful is for an UMTS/GPRS device that has to perform GPRS Attach procedures before initiating PDP Context Activation Procedures. The GPRS Attach procedures typically cause the network to initiate the Authentication and Key Agreement procedure towards the UE, followed by additional radio access level signaling to establish integrity protection and/or ciphering over the RNC/BSC allocated radio channel resources. Hence, the PDP Context Activation Procedure for a GPRS or UMTS device would consume even more time, which would cause the PPP client to timeout.

Another timeout problem occurs when the PPP client includes requests for either DNS addresses and/or WINS addresses and the PPP server cannot respond in a timely manner until the network assigns the addresses. After the timeout period, the PPP client would exclude the requests for DNS addresses and/or WINS addresses in the IPCP packets that the PPP client sends to the PPP server. The PPP client is typically configured to drop the request for DNS addresses after M retries, wherein M is usually four (4). Four (4) retries usually corresponds to approximately 15 seconds of the PPP negotiations.

If the PPP server attempts to assign IP and DNS addresses after 15 seconds, the PPP client will not accept the DNS and/or WINS addresses since the PPP client did not make a specific request for such after the timeout period. Note that the PPP client will still accept the IP address and successfully set up the PPP link. The PPP client only accepts values that the PPP client specifically requested and in this situation, the PPP client had stopped making the requests for DNS and/or WINS addresses after 15 seconds. When the PPP client stops making the requests for DNS addresses, the assigned data pipeline of the PPP link is rendered useless since there are no DNS server addresses that can be used by the applications running on the same device as the PPP client. In order to use the assigned data pipeline, the user of the device would have to explicitly state the IP address of the host to which the user wishes to contact. This situation can be problematic for web surfing where most web pages have embedded Hyper Text Markup Language (HTML) links using host names, rather then the actual IP addresses of the links.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method for extending a protocol synchronization period between a Point-to-Point Protocol (PPP) client and a PPP server, wherein the PPP server is located on a wireless communication device, the method comprising:

generating a negative acknowledgment message at the PPP server in response to an Internet Protocol Control Protocol (IPCP) configuration request from the PPP client, wherein the IPCP configuration request comprises a requested IP address parameter, wherein the generating comprises including supplemental IPCP information instead of an IP address in response to the requested IP address parameter and deliberately excluding an IP address in order to extend the protocol synchronization period, wherein the supplemental IPCP information comprises a type of address different from a potentially valid IP address assignable to the PPP client for establishing a PPP communication link; and generating an acknowledgement message at the PPP server in response to the IPCP configuration request from the PPP client if the PPP server has received all required parameters to complete the protocol synchronization period.

2. The method of claim 1, further comprising:

generating a new negative acknowledgment message at the PPP server in response to a repeated IPCP configuration request from the PPP client, wherein the new negative acknowledgement message includes different supplemental IPCP information from a previous negative acknowledgement message and further deliberately excludes an IP address.

3. The method of claim 1, further comprising:

generating a new negative acknowledgment message at the PPP server in response to a repeated IPCP configuration request from the PPP client, wherein the new negative acknowledgement message includes the same supplemental IPCP information as a previous negative acknowledgement message and further deliberately excludes an IP address.

4. The method of claim 1, wherein the supplemental IPCP information comprises a Domain Naming System (DNS) address.

5. The method of claim 1, wherein the supplemental IPCP information comprises a Windows Internet Naming Service (WINS) address.

6. Apparatus for extending a protocol synchronization period between a Point-to-Point Protocol (PPP) client and a PPP server, wherein the PPP server is located on a wireless communication device, the apparatus comprising:

at least one memory configured to execute a set of computer-implemented instructions stored in the at least one memory, the set of computer-implemented instructions for:

generating a negative acknowledgment message at the PPP server in response to an Internet Protocol Control Protocol (IPCP) configuration request from the PPP client, wherein the IPCP configuration request comprises a requested IP address parameter, wherein the generating comprises including supplemental IPCP information instead of an IP address in response to the requested IP address parameter and deliberately excluding an IP address in order to extend the protocol synchronization period wherein the supplemental IPCP information comprises a type of address different from a potentially valid IP address assignable to the PP client for establishing a PPP communication link; and generating an acknowledgement message at the PPP server in response to the IPCP configuration request from the PPP client if the PPP server has received all required parameters to complete the protocol synchronization period.

7. The apparatus of claim 6, wherein the at least one processing element is located in an electronic device that hosts the PPP client.

8. The apparatus of claim 6, wherein the at least one processing element is located in an electronic device that does not host the PPP client.

9. An apparatus for extending a protocol synchronization period between a Point-to-Point Protocol (PPP) client and a PPP server, wherein the PPP sewer is located on a wireless communication device, the apparatus comprising:

means for generating a negative acknowledgment message at the PPP sewer in response to an Internet Protocol Control Protocol (IPCP) configuration request from the PPP client, wherein the IPCP configuration request comprises a requested IP address parameter, wherein the generating comprises including supplemental IPCP information instead of an IP address in response to the requested IP address parameter and deliberately excluding an IP address in order to extend the protocol synchronization period, wherein the supplemental IPCP information comprises a type of address different from a potentially valid IP address assignable to the PPP client for establishing a PPP communication link; and means for generating an acknowledgement message at the PPP server in response to the IPCP configuration request from the PPP client if the PPP server has received all required parameters to complete the protocol synchronization period.

10. A computer-implemented method for extending a protocol synchronization period between a Point-to-Point (PPP) client and a PPP server, comprising:

engaging the PPP client in an Internet Protocol Control Protocol (IPCP) negotiation to obtain IPCP parameters operable in a PPP communication link based on an initial configuration request message received from the PPP client, wherein the initial configuration request message comprises initial IPCP parameters comprising an initially-requested IP address; and triggering the PPP client to generate subsequent configuration request messages comprising the initially-requested IP address based on corresponding negative acknowledgement messages excluding an IP address and including supplemental IPCP information instead of the IP address in order to extend the protocol synchronization periods, wherein the supplemental IPCP information comprises a type of address different from a potentially valid IP address assignable to the PPP client for establishing a PPP communication link.

11. The method of claim 10, farther comprising triggering the PPP client to avoid dropping a supplemental IPCP information parameter from the subsequent configuration request messages to avoid a supplemental IPCP information request timeout.

12. The method of claim 11, wherein triggering the PPP client to avoid dropping the supplemental IPCP information further comprises including subsequent supplemental IPCP information in the negative acknowledgement message, wherein the subsequent supplemental IPCP information comprises a type of address different from a potentially valid IP address assignable to the PPP client for establishing a PPP communication link.

13. The method of claim 11, wherein triggering the PPP client to avoid dropping the supplemental IPCP information further comprises including arbitrary subsequent supplemental IPCP information in the negative acknowledgement message.

* * * * *

UNITED STATES PATENT AND TRADEMARK OFFICE
CERTIFICATE OF CORRECTION

PATENT NO. : 7,412,528 B2
APPLICATION NO. : 10/649552
DATED : August 12, 2008
INVENTOR(S) : Idreas Mir, Senthil Viswanathan and Marcello Lioy It is certified that error appears in the above-identified patent and that said Letters Patent is hereby corrected as shown below:

In Column 13, line 1, "sewer", should be --server--
In Column 13, line 4, "sewer", should be --server--

Signed and Sealed this

Twenty-fourth Day of November, 2009

David J. Kappos
*Director of the United States Patent and Trademark Office*